(12) United States Patent
Bremicker (10) Patent No.: US 6,457,336 B1
(45) Date of Patent: Oct. 1, 2002

(54) LOCK

(75) Inventor: Michael Bremicker, Rehe (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 59 days.

(21) Appl. No.: 09/639,013

(22) Filed: Aug. 15, 2000

(30) Foreign Application Priority Data

Aug. 16, 1999 (DE) .......................................... 199 38 740

(51) Int. Cl.[7] .............................................. E05B 67/36
(52) U.S. Cl. .............................. 70/34; 70/38 A; 70/39; 70/233
(58) Field of Search ........................ 70/33, 38 A, 38 R, 70/39, 43, 233, 226, 379 R (56) References Cited

U.S. PATENT DOCUMENTS

| 5,331,830 A | 7/1994 | Su ................................ 70/38 A |
| 5,410,895 A | 5/1995 | Hsu ................................ 70/39 |
| 5,511,400 A | 4/1996 | Ma ................................ 70/38 A |
| 5,568,740 A | 10/1996 | Lin ................................ 70/49 |
| 5,964,107 A | 10/1999 | Chang ............................ 70/33 |
| 6,055,833 A | * 5/2000 | Ding-Chiang .................. 70/39 |

FOREIGN PATENT DOCUMENTS

| DE | 29614359 U1 | 11/1996 |
| EP | 0413065 A1 | 2/1991 |
| WO | WO 95/12046 | 5/1995 |

* cited by examiner

Primary Examiner—Suzanne Dino Barrett
(74) Attorney, Agent, or Firm—Townsend and Townsend and Crew LLP (57) ABSTRACT

A lock, in particular a brake disk lock for motorcycles, comprising a lock housing and a bolt lockable thereto; with the bolt having a stop member, a bolt head and a bolt neck arranged therebetween, and with the lock housing having a receiving region to receive the bolt head of the bolt, a lock cylinder and a latch movable by a rotary actuation of the lock cylinder to lock or unlock the bolt head inserted into the receiving region. The lock housing further has at least one conversion element, by means of which a rotary actuation of the lock cylinder can be converted into an axial locking or unlocking movement of the latch.

10 Claims, 8 Drawing Sheets

LOCK

BACKGROUND OF THE INVENTION

The invention relates to a lock, in particular a brake disk lock for motorcycles, comprising a lock housing and a bolt lockable thereto, with the bolt having a stop member, a bolt head and a bolt neck arranged therebetween, and with the lock housing having a receiving region to receive the bolt head of the bolt, a lock cylinder and a latch movable by a rotary actuation of the lock cylinder to lock or unlock the bolt head inserted into the receiving region.

To lock an object using such a lock, the bolt is guided with its bolt head pointing forwards through a passage aperture of the object, for example, through a venting aperture of a motorcycle brake disk, so that the stop member abuts one end of the passage aperture and the passage aperture grips around the bolt neck. The lock housing is then set onto the bolt head protruding from the other end of the passage aperture such that it projects into the receiving region of the lock housing. The latch is subsequently guided over the bolt head by means of a rotary actuation of the lock cylinder. The lock is secured against being removed from the passage aperture by the abutting of the stop member and the locked lock housing at respective ends of the passage aperture.

It is known to lock the bolt head inside the lock housing to provide a locking sleeve with a peripheral groove, which can be rotatably actuated by the lock cylinder, as the latch. The bolt head of the bolt can be inserted into or removed from the receiving region of the lock housing through a correspondingly wide section of the peripheral groove in the unlocked state of the lock. The locking sleeve is turned to lock the lock, with a narrower section of the peripheral groove being turned along the bolt neck over the bolt head of the bolt so that the bolt head is locked against removal from the lock housing.

The disadvantage with the known lock is that the accommodation of the locking sleeve rotating around the receiving region requires additional space in the environment of the receiving region. The design of the lock thus becomes larger in an unwanted manner in the environment of the receiving region.

SUMMARY OF THE INVENTION

It is an object of the invention to provide a lock whose locking mechanism requires the lowest possible volume, in particular in the environment of the receiving region provided for the bolt head of the bolt.

This object is satisfied for a lock of the kind initially mentioned by the lock housing further having at least one conversion element, by means of which a rotary actuation of the lock cylinder is convertible into an axial locking or unlocking movement of the latch.

With the lock in accordance with the invention, a conversion element therefore provides that a rotational movement of the lock cylinder actually effects an axial movement of the latch. In an unlocking movement, the latch is therefore removed from the receiving region in a lateral direction in a straight line and thus in the most direct way possible so that no free space has to be left free for a locking or unlocking movement of the latch or for a corresponding locking mechanism in the whole other environment of the receiving region. A cylindrical free space surrounding the receiving region, as is required in the prior art, can, in particular, be omitted. The axial movement of the latch effected by the conversion element thus leads to a substantial reduction in the space requirements of the locking mechanism in the environment of the receiving region of the lock housing.

As the action of the conversion element results in the latch only having to execute an axial movement, it can be made flat or only slightly curved at least in the environment of the receiving region of the lock housing, so that a further advantageous reduction in the depth of the lock housing is achieved.

The invention furthermore allows a new shape for the bolt head of the bolt. The bolt head has previously been spherical in shape, that is, designed with a round cross-section corresponding to the rotational movement of the locking sleeve. As only an axial locking or unlocking movement is provided in the invention, it is sufficient if the bolt head extends in a disk-shaped, flat manner with a round or angular outline within a plane which extends perpendicularly to the direction of the insertion of the bolt head into the lock housing or to the longitudinal direction of the bolt neck. Such a disk-shaped design of the bolt head leads to a further reduction in the lock housing depth and to the volume required for the receiving region.

The conversion element mentioned can be provided as or on a separate component that connects to both the lock cylinder and the latch. Alternatively or additionally, a conversion element can be integrated in the latch and/or the lock cylinder.

In a preferred embodiment of the invention, a conversion element provided inside the lock housing is made as an inclined guide which cooperates with a further conversion element, in particular a cam or a further inclined guide. This inclined guide or the further inclined guide can be made, for example, as a curved edge of a part of the lock housing, as an end of a section of a lock housing part extending with a curve or as a groove extending with a curve inside the lock housing which abuts in each case the cam or the further inclined guide respectively or engages with the cam or the further inclined guide respectively.

It is furthermore possible for two pairs comprising in each case an inclined guide and a cam cooperating therewith or an inclined guide cooperating therewith respectively, with one pair effecting the locking movement of the latch and the other pair the unlocking movement in response to a corresponding rotary actuation of the lock cylinder. As an alternative, a single pair of cooperating conversion elements can also be provided, for example for the unlocking movement of the latch. In this case, the respective counter axial direction of the lock can be effected by a restoring spring.

It is furthermore preferred when a driver is provided in the lock housing which is rotationally effectively connected to the lock cylinder and has one or more conversion elements. As a result of this, no special conversion elements have to be provided on the lock cylinder itself, which allows the use of commercial lock cylinders in an advantageous manner. Such a driver is, however, not absolutely necessary; for example, the cam of the lock cylinder can also cooperate with a conversion element, for example an inclined guide, provided on the latch.

In a particularly advantageous embodiment of the invention, at least one holding element is provided in the environment of the receiving region to hold the bolt head of the bolt inserted into the receiving region. When unlocking the bolt head inserted into the receiving element, such a holding element prevents the bolt from accidentally leaving the receiving region and falling out of the lock housing.

Such an uncontrolled release of the bolt from the lock housing can lead to damage to the locked object, for example to damage to a motorcycle rim surrounding a brake disk. Such an uncontrolled release of the bolt can, however, frequently not be easily avoided, as when the lock is being unlocked, the lock cylinder is rotatably actuated by one hand and the lock housing held against it by the other. This problem is solved by the holding element which only releases the bolt already unlocked, when the user deliberately pulls the unlocked bolt out of the lock housing or pulls the lock housing off the bolt.

Such a holding element cannot be provided easily for a lock in accordance with the prior art since - as explained - the locking sleeve serving as the latch surrounds the receiving region of the lock housing along its whole periphery and thus does not leave any space for an additional holding element.

The holding element preferably has at least one latch element at which the bolt head can be latched when inserted into the receiving region. This latch element can, for example, be formed by a closed ring-like holding edge or one or more pairs of latch arms opposing one another in each case which grip resiliently behind the bolt head. To fulfill the holding function described even when the bolt hangs down vertically, the holding force exerted by the holding element is preferably greater than the weight of the bolt.

The invention is described below by way of example with reference to the drawings.

BRIEF DESCRIPTION OF THE DRAWINGS

FIG. 2c is a detailed view of the inner housing, the cylinder housing and the drive disk of FIG. 2a;

DESCRIPTION OF THE PREFERRED EMBODIMENTS

Figure 1:
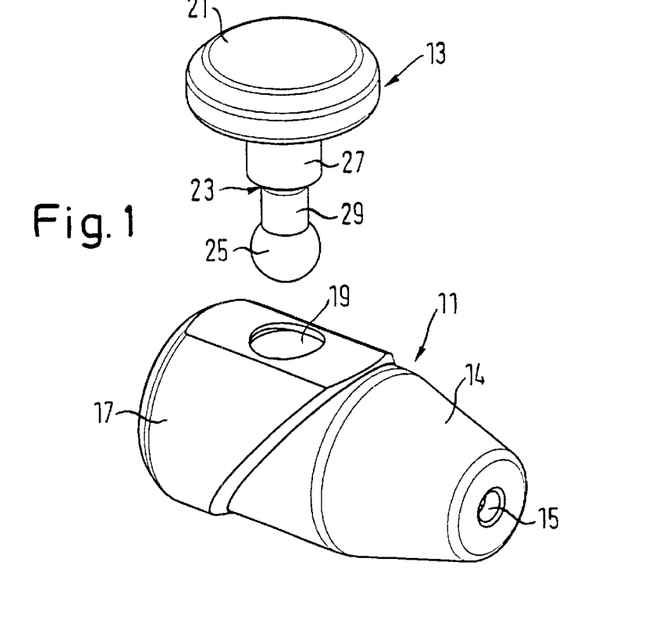
FIG. 1 is a perspective view of a lock in accordance with the invention comprising a lock housing and a bolt released therefrom.

FIG. 1 shows a lock comprising a lock housing 11 and a bolt 13 released therefrom. The lock housing 11 has a lock housing casing 14 made of metal which has a key aperture 15 at the tip of a truncated cone-shaped section and is partially surrounded at a cylindrical section connecting thereto by a protective cap 17 made of plastic. The lock housing casing 14 and the protective cap 17 have an insertion aperture 19 on the jacket surface of the cylindrical section of the lock housing casing 14.

The bolt 13 has a round stop disk 21 and a cylindrical bolt neck 23 connecting thereto which opens on an essentially spherically shaped bolt head 25. The bolt neck 23 has a gripping section 27 on the stop disk 21 side and a bolt section 29 tapered relative to the gripping section 27 on the bolt head 25 side. The bolt 13 is made in one piece of metal.

FIGS. 2a and 2b, 3a and 3b and 4a and 4b show exploded representations of parts of the lock of FIG. 1. An essentially hollow-cylindrical cylinder housing 31 made of metal and an inner housing 33 made of plastic and fixed thereon, which essentially has the shape of a cylinder segment, are provided inside the lock housing casing 14. A driver disk 35 made of metal is provided between the cylinder housing 31 and the inner housing 35.

The lock housing casing 14 furthermore contains a sliding latch 37 made of metal. This has a bolt section 39 which is provided to contact and slide along the inner housing 33 and which is designed with an essentially cylinder segment shape with a longitudinal recess so that the bolt section 39 appears to be U-shaped in a top view. A deflection section 41, which essentially has the shape of a hollow cylinder segment and which is provided to contact the driver disk 35, connects to the closed side of the U-shape of the bolt section 39.

Furthermore, a housing cover 43 and—not shown in FIGS. 2a to 4b—a lock cylinder arranged inside the cylinder housing 31, a drill protection disk arranged between the lock cylinder and the key aperture 15 of the lock housing casing 14 and a stop spring are provided.

FIGS. 5b and 5c, 6a and 6c and 7a and 7b show the construction of the lock with the bolt 13 released, the bolt 13 inserted and the bolt 13 locked respectively. The cylinder housing 31 and the lock cylinder (not shown in the figures) inserted therein are held by the stop spring shown with reference numeral 45 in FIG. 5b.

The driver disk 35 is supported between the cylinder housing 31, the inner housing 33 and the sliding latch 37 such that it can be rotationally moved around the longitudinal axis of the lock housing 11. It has a central coupling recess 47 with which the lock cylinder engages to transfer a rotational movement.

Figure 5A:
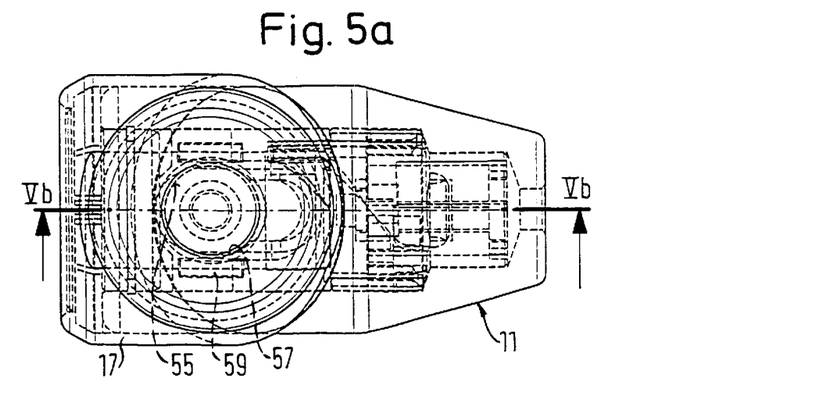
FIGS. 5a to 5c show the lock of FIG. 1 in a top view, in a lateral cross-section along the plane Vb—Vb and in a lateral cross-section along the plane Vc—Vc respectively.
Figure 5B:
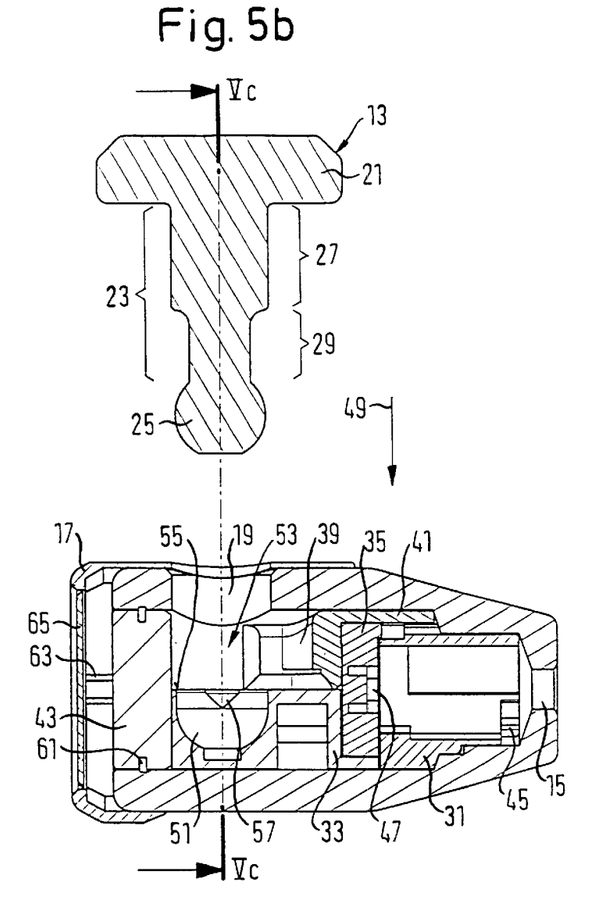

In extension of the insertion aperture 19 of the lock housing casing 14 with respect to an insertion direction 49 perpendicular to the longitudinal axis of the lock housing 11, the inner housing 33 has an essentially semispherical receiving recess 51 which forms a receiving region 53 together with the interior of the lock housing casing 14 between the insertion aperture 19 and the accepting recess 51 (FIG. 5b).

Figure 5C:
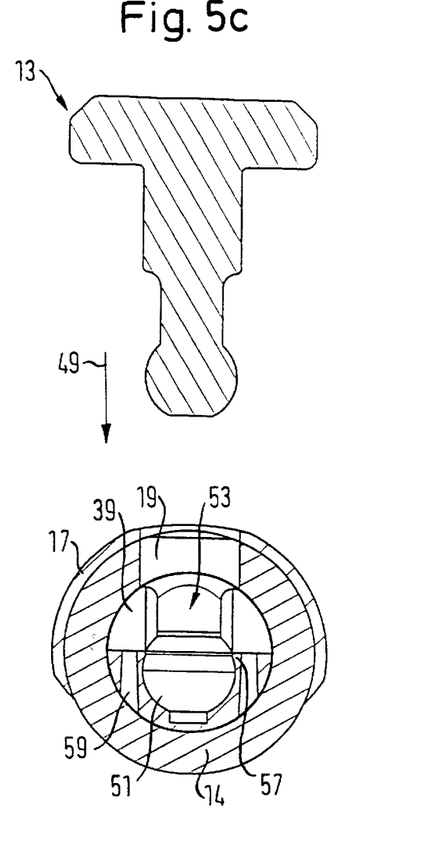

The upper side of receiving recess 51 opens with respect to the representation of FIG. 5b on a holding edge 55 which extends perpendicularly to the insertion direction 49 within one plane. In deviation from a circular shape, this has two latch cams 57 formed on the inner housing 33 and lying opposite one another which project into the receiving recess 51 (FIG. 5c). A restoring spring slot 59 is provided in the inner housing 33 behind each of the two stop cams 57 (FIG. 2c).

The housing cover 43 adjacent the inner housing 33 is secured to an inner peripheral surface of the lock housing casing 14 by means of a retaining ring 61. Adjacent to this, the protective cap 17 has a stabilizing vane arrangement 63 and a protective cap cover 65. The protective cap 17, the vane arrangement 63 and the protective cap cover 65 are not shown in FIGS. 7a and 7b.

Figure 7A:
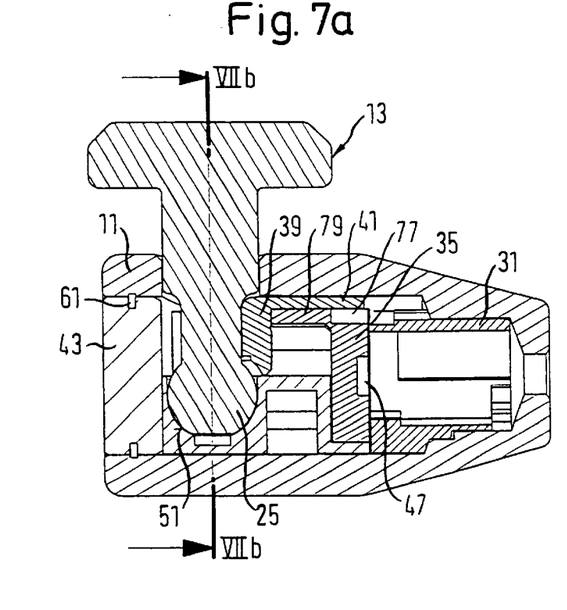
FIGS. 7a and 7b show the lock of FIGS. 6a and 6b in a locked state.
Figure 7B:
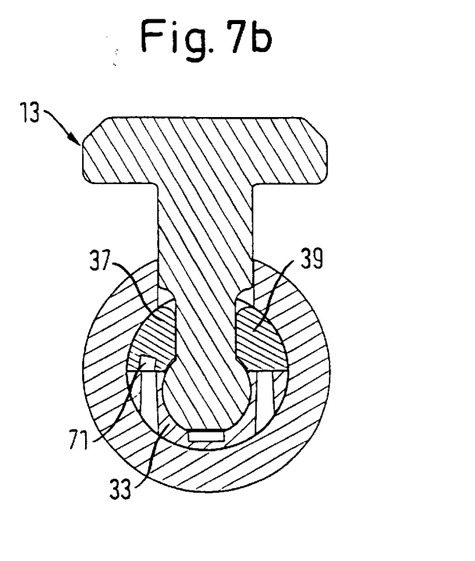
Figure 8:
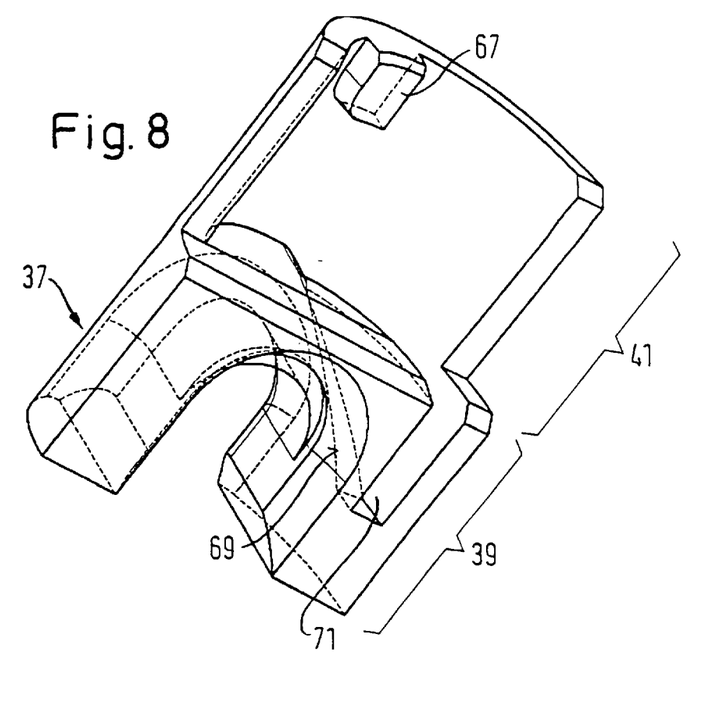
FIG. 8 is a perspective view of the sliding bolt diagonally from below.

FIG. 8 shows the sliding latch 37 diagonally from below, with nonvisible edges being shown by broken lines. Some edges of the U-shaped bolt section 39 of the sliding latch 37 are chamfered to allow the insertion of the bolt 13 into the receiving region 53 of the lock housing 11 (cf. FIGS. 5b and 5c) and to ensure a positive gripping of the bolt section 29 of the bolt neck 23 and of the bolt head 25 of the bolt 13 (cf. FIGS. 7a and 7b).

A guide cam 67 is formed on the inner peripheral surface of the deflection section 41 of the sliding latch 37. A curved shoulder edge 69 extending and opening on an engagement slot 71 on the bottom side of the sliding latch 37 shown in FIG. 8 extends between the bolt section 39 and the deflection section 41.

Figure 9:
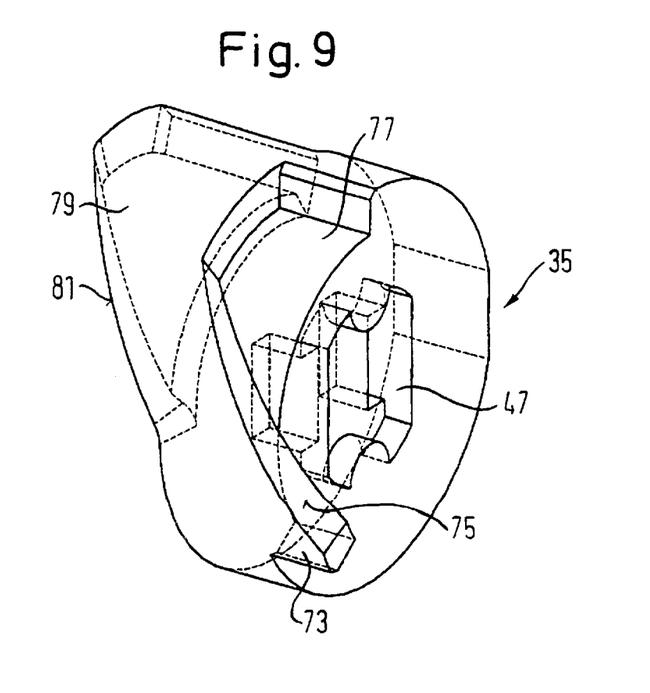
FIG. 9 is a perspective view of the driver disk diagonally from above/the front.

FIG. 9 shows the side of the drive disk 35 facing the lock cylinder in a perspective view. An unlocking tongue 73 is formed on the outer periphery of the driver disk 35 in axial extension in the direction of the lock cylinder, said unlocking tongue 73 having the shape of a curved triangular surface and having a curved unlocking end surface 75 which extends up to an engagement recess 77 on the jacket surface of the driver disk 35 (cf. also FIGS. 2b, 3b and 10b).

Figure 2A:
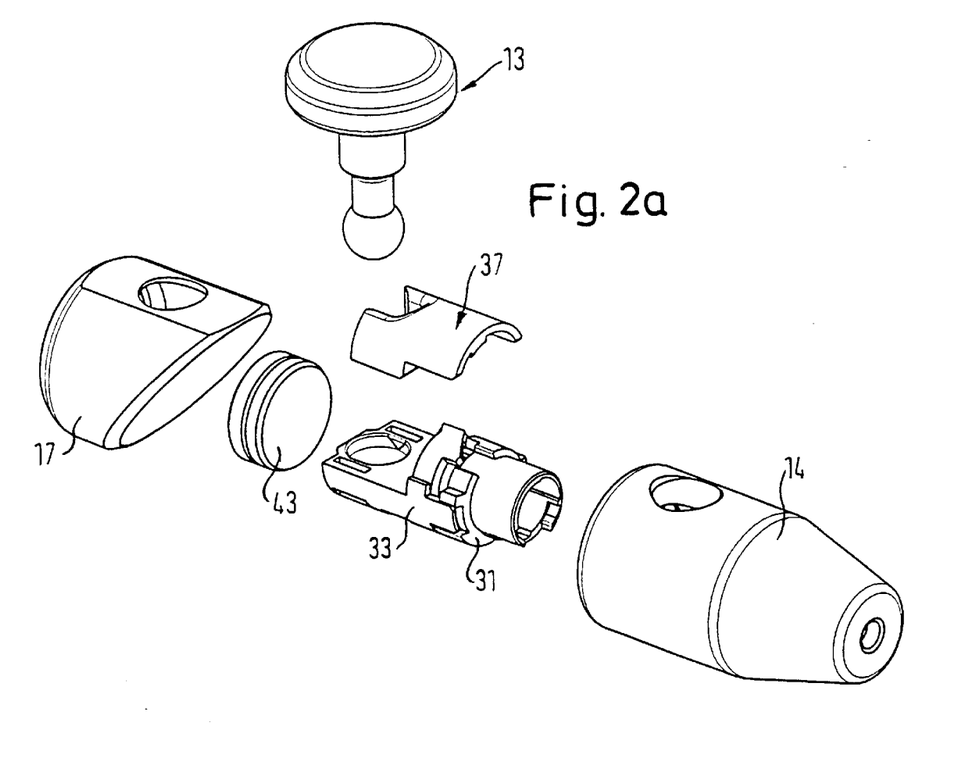
FIGS. 2a and 2b are exploded representations of the lock with an inner housing, a cylinder housing and a driver disk arranged therebetween, with the driver disk assuming an unlocking state or a locking state.
Figure 2B:
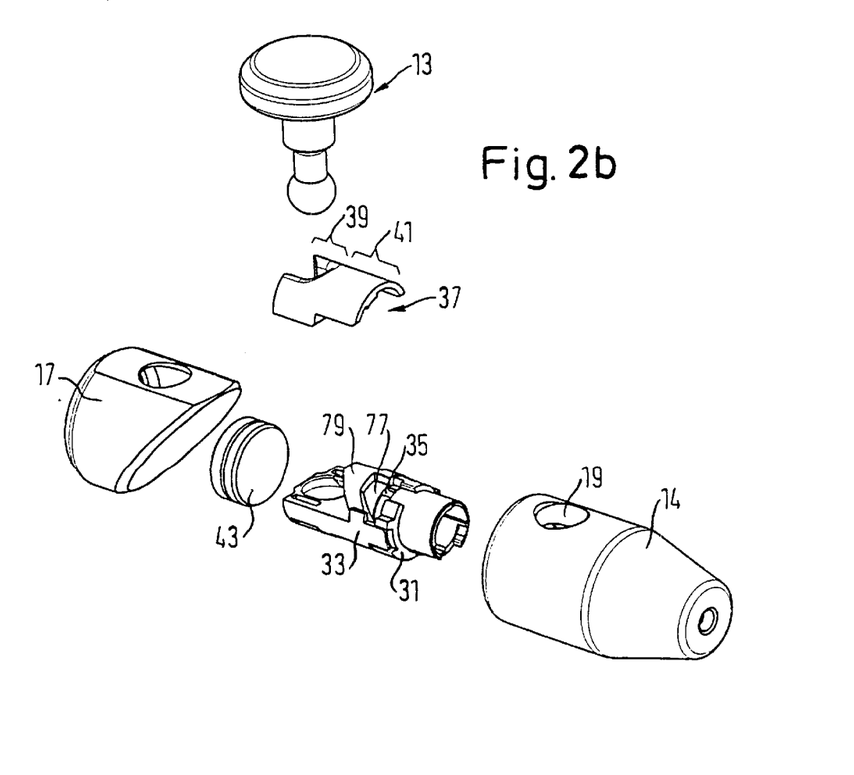
Figure 2C:
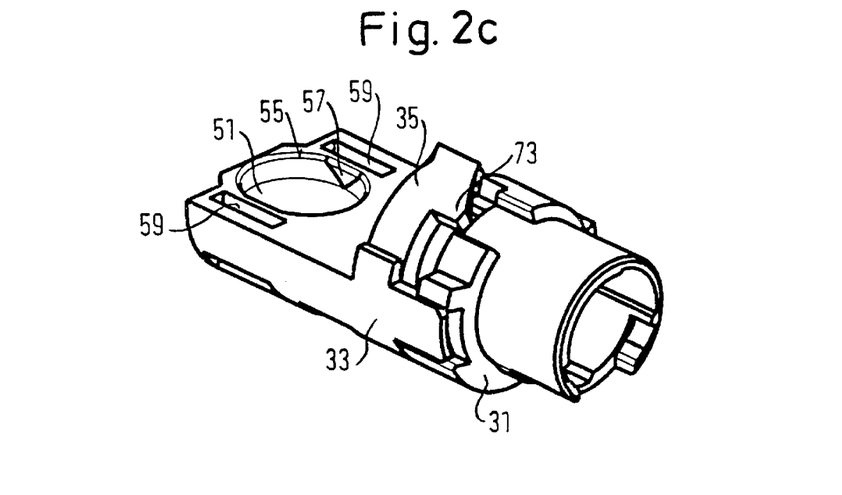
Figure 3A:
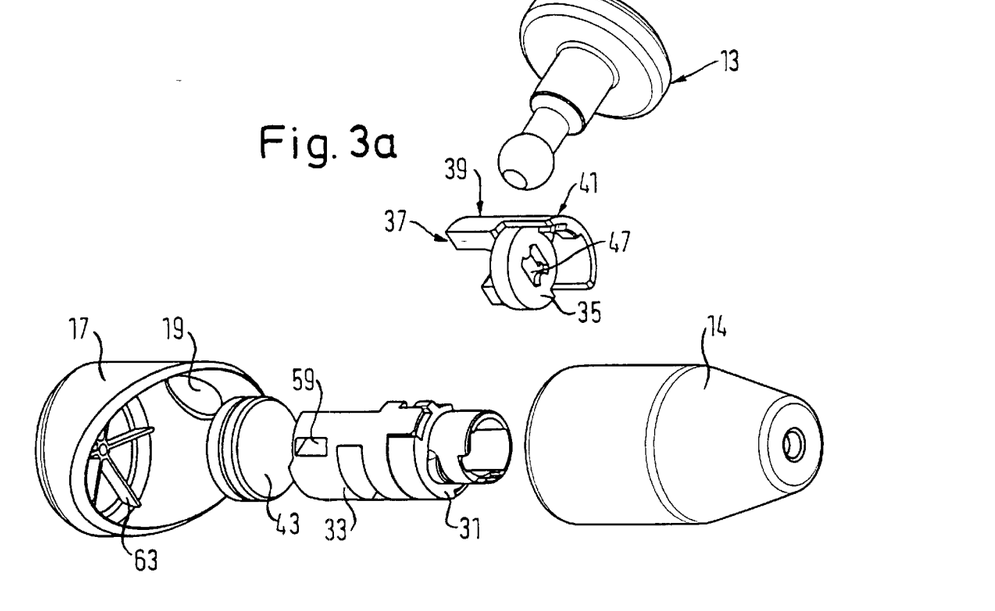
FIGS. 3a and 3b are exploded representations of the lock, with the driver disk and a sliding latch arranged thereon assuming an unlocked and a locked state relative to one another respectively.
Figure 3B:
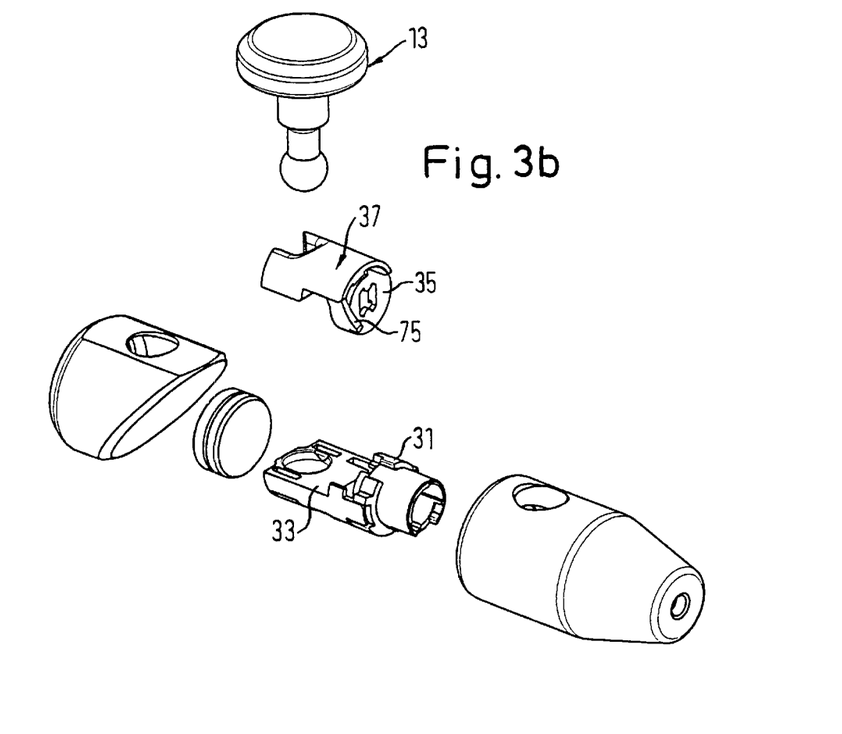
Figure 4A:
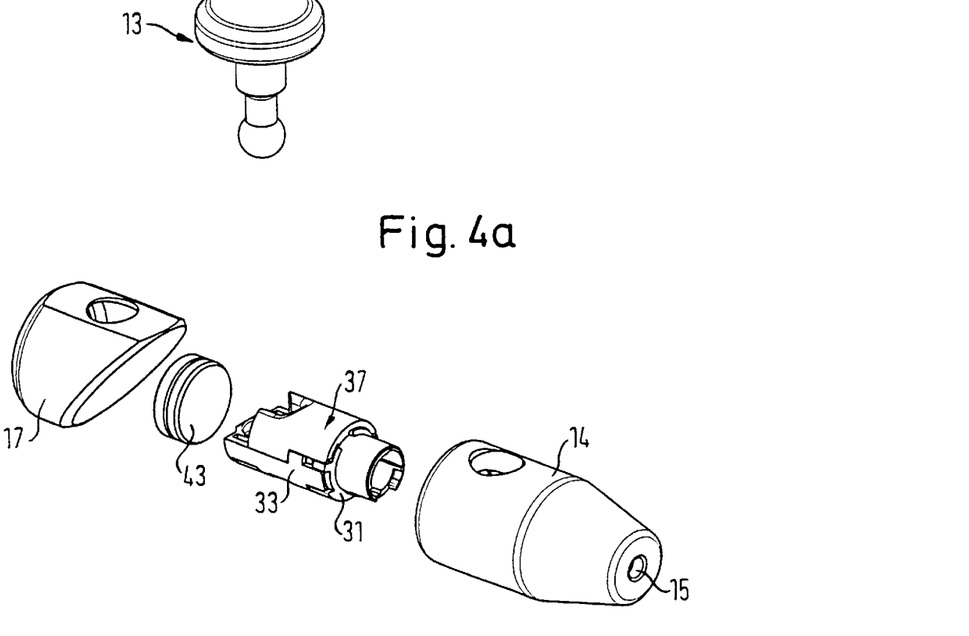
FIGS. 4a and 4b are exploded representations of the lock, with the sliding latch assuming an unlocked and a locked state respectively.
Figure 4B:
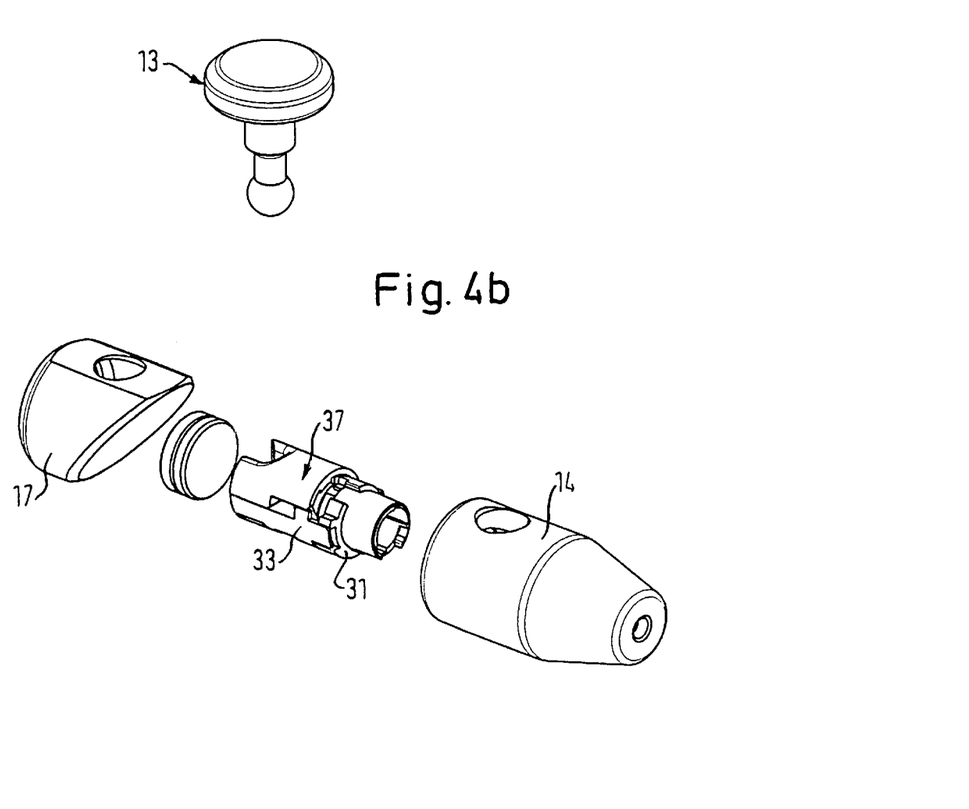
Figure 10A:
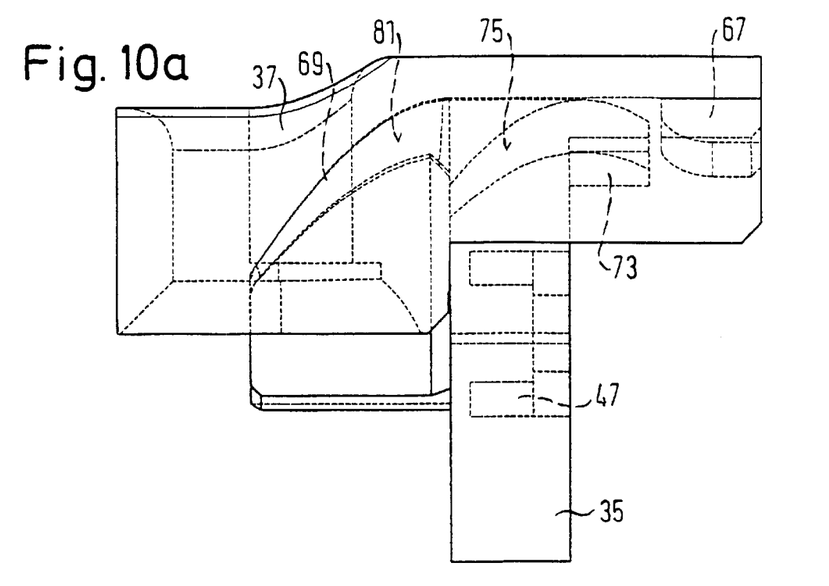
FIGS. 10a and 10b are side views of the driver disk and the sliding latch arranged thereon in an unlocked and a locked state respectively.
Figure 10B:
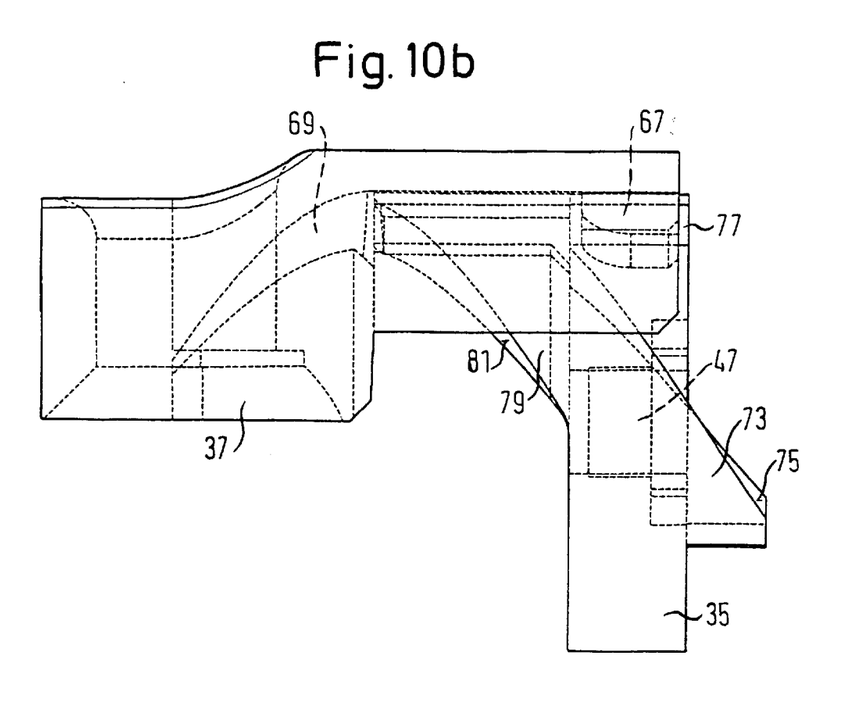

The driver disk 35 has a locking tongue 79 in axial extension of the outer periphery of the driver disk 35, said locking tongue 79 having the form of a curved trapezoid surface and having a locking end surface 81 which curves up to the edge of the jacket surface of the driver disk 35 (cf. also FIGS. 2b, 7a and 10b).

The lock shown in the figures serves to lock an object by inserting the bolt 13 into a passage aperture of the object and by a subsequent locking of the bolt 13 to the lock housing 11. The gripping section 27 of the bolt neck 23 is thus caught radially by the passage aperture and axially by the stop disk 21 or the lock housing 11. In accordance with the invention, a rotary actuation of the lock cylinder or of the driver disk 35 connected thereto is converted during locking into an axial locking or unlocking movement of the sliding latch 37. This conversion is described in more detail below.

The sliding latch 37 is drawn back out of the receiving region 53 of the lock housing 11 in the unlocked state of the lock to allow the insertion of the bolt 13 through the insertion aperture 19 into the lock housing 11 or the removal of the bolt 13 from the lock housing 11 (cf. FIGS. 5a to 5c). This unlocked state of the lock corresponds to a position of the driver disk 35, in which the locking tongue 79 of the driver disk 35 penetrates the engagement slot 71 of the sliding latch 37 and in which the locking end surface 81 is opposite the shoulder edge 69. Furthermore, the guide cam 67 of the sliding latch 37 is located at the tip of the unlocking tongue 73 of the driver disk 35. This unlocked position of the driver disk 35 can be seen in particular from FIG. 10a and from FIGS. 2a, 2c, 3a, 4a, 5b and 6a.

Figure 6A:
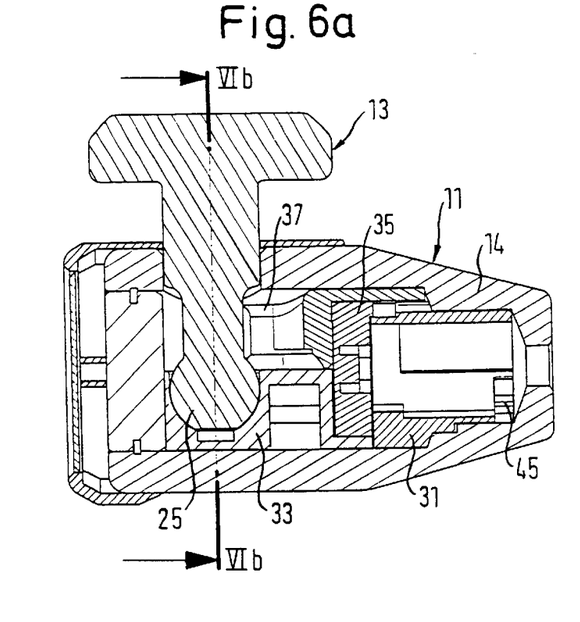
FIGS. 6a and 6b show the lock housing with a bolt inserted therein, but not locked, in a lateral cross-section and in a further lateral cross-section along the plane VIb—VIb respectively.
Figure 6B:
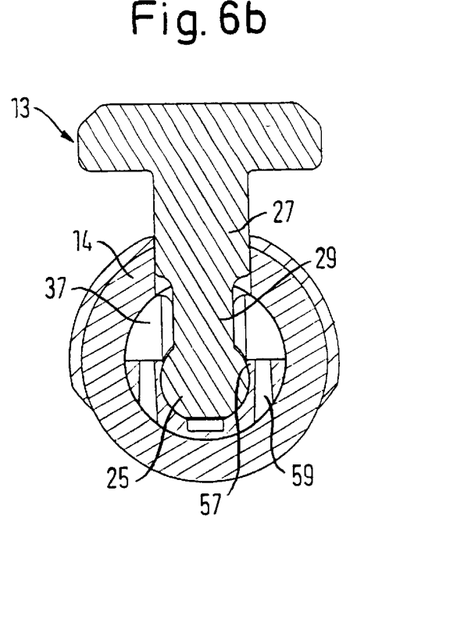

To lock the bolt 13 inserted into the lock housing 11 in accordance with FIGS. 6a and 6b, starting from this unlocked state, the lock cylinder is rotatably actuated by means of a fitting key and thus the driver disk 35 is turned counter-clockwise through 90° with respect to the view of FIG. 9. In this way, the locking end surface 81 of the locking tongue 79 comes into areal contact with the shoulder edge 69, whereby the sliding latch 37 is forced into an axial movement away from the driver disk 35 during a continuing rotary movement (cf. 10a).

The axial movement of the sliding latch 37 is therefore due, on the one hand, to the sliding along of the curved locking end surface 81 along the correspondingly curved shoulder edge 69 and, on the other hand, to the fact that the bottom side of the sliding latch 37 abuts the top side of the inner housing 33 or of the cylinder housing 31 respectively (cf. FIGS. 4a and 4b) and its upper side abuts the inner peripheral surface of the lock housing casing 14 (cf. FIGS. 6a and 6b and FIGS. 7a and 7b). The sliding latch 37 can therefore not escape laterally to follow the rotational movement of the driver disk 35.

The sliding latch 37 instead performs the axial movement described, by means of which it finally grips around the tapered bolt section 29 of the bolt neck 23 from three sides. On the conclusion of this locking movement, the locking tongue 79 of the driver disk 35 has left the engagement slot 71 of the sliding latch 37 (FIG. 8), and the guide cam 67 has come to lie in the engagement recess 77 on the jacket surface of the driver disk 35. The position of the driver disk 35 achieved in the state of the lock locked in this way can be seen in particular from FIG. 10 and from FIGS. 2b, 3b, 4b and 7a.

To now again retract the sliding latch 37 to again release the bolt 13, starting from this locked state of the lock, the driver disk 35 is turned—by means of a corresponding rotary actuation of the cylinder lock using the fitting key—in a clockwise direction in accordance with the view of FIG. 9. In this way, the unlocking end surface 75 of the unlocking tongue 73 (FIG. 10b) contacts the guide cam 67 of the sliding latch 37 and guides it along the whole length of the unlocking end surface 75 during a continuous rotational movement. In this way, the sliding latch 37 is drawn away from the bolt section 29 of the bolt neck 23 in an axial direction, and the locking tongue 79 gradually penetrates the engagement slot 71 of the sliding latch 37. The unlocked state of the lock is again achieved in this way by conclusion of a 90° rotation of the driver disk 35.

As the sliding latch 37 is moved in an axial direction for the locking and unlocking, only a lateral access of the sliding latch 37 to the receiving region 53 is required so that the environment of the receiving region 53 can be designed with a low construction depth on all other sides without having to take the locking mechanism into account. There is, in particular, with respect to the representation in accordance with FIGS. 5b and 5c, no additional space requirement for the locking mechanism such as is the case with a rotating locking sleeve in accordance with the prior art.

In addition—deviating from the embodiment shown in the figures—a further reduction in construction depth can be achieved by the sliding latch 37 being made flat or at most arched in the shape of a hollow cylinder segment with a lower depth in the insertion direction 49 than the bolt section 39 of the sliding latch 37 shown and by the bolt 13 being shortened correspondingly.

In the embodiment shown in the figures, the space savings achieved by the only axial movement of the sliding latch 37 is used to allow a particularly advantageous latch hold of the bolt 13 inserted into the lock housing 11, but not locked. This latch hold is described in more detail below.

The holding edge 55, which restricts the receiving recess 51 of the inner housing 33 having a closed periphery, does not have a circular shape in the non-loaded state, but rather has the two latch cams 57 opposite one another (cf. FIG. 2c and FIGS. 5b and 5c). The inner periphery of the holding edge corresponds to the maximum outer diameter of the bolt head 25 in a plane which is perpendicular to the insertion direction 49 or exceeds this outer diameter only slightly.

When the bolt head 25 is inserted into the receiving recess 51, the holding edge 55 is reshaped briefly to a shape corresponding to the outer diameter of the bolt head 25 due to the inner housing 33 being made of elastic plastic and to the provision of the restoring spring slots 59. Following the full insertion of the bolt head 25 into the receiving recess 51, the holding edge 55 springs back into its normal, non-circular shape so that the bolt head 25 is gripped at least by the two latch cams 57 (cf. FIG. 6b). The bolt 13 inserted into the lock housing 11 is held in this way even when the bolt 13 is not locked.

The user can remove the unlocked bolt 13 from the lock housing 11 safely and in a controlled manner by overcoming the holding force exerted on the bolt head 25 by the holding edge 55. The user can, vice versa, insert the bolt head 25 into the receiving recess 51 before he subsequently locks the lock.

It should be noted with respect to the design of the holding edge 55 visible from FIG. 2c that its shape does not necessarily have to be closed, but can also be interrupted so that, for example, the two latch cams 57 can be designed as essentially free-standing latch arms. As an alternative to this, it is also possible to provide the holding edge 55 without latch cams, but with a closed, oval shape.

What is claimed is:

1. A brake disk lock for motorcycles, comprising a lock housing and a bolt lockable thereto;

the bolt having a stop member, a bolt head and a bolt neck arranged therebetween;

the lock housing having a receiving region to receive the bolt head of the bolt, a lock cylinder and a latch movable by a rotary actuation of the lock cylinder to lock or unlock the bolt head inserted into the receiving region;

the lock housing further having at least one conversion element for converting a rotary actuation of the lock cylinder into an axial locking or unlocking movement of the latch, and at least one holding element in or on the receiving region to hold the bolt head inserted into the receiving region and having a resilient holding edge which has a non-circular shape in its relaxed state.

2. A lock in accordance with claim 1, including at least one first inclined guide provided as a conversion element and at least one cam and/or one second inclined guide provided as a further conversion element cooperating with the first inclined guide.

3. A lock in accordance with claim 2, wherein the first inclined guide and/or the second inclined guide is formed by a curved shoulder edge, front end or groove.

4. A lock in accordance with claim 3, including a cooperating pair comprising a first inclined guide and a cam or a second inclined guide for the locking movement of the latch and a further cooperating pair comprising a first inclined guide and a cam or a second inclined guide for the unlocking movement of the bolt.

5. A lock in accordance with claim 1, wherein the conversion element is provided on the latch and a further conversion element is provided on the lock cylinder or on a driver connected to the lock cylinder.

6. A lock in accordance with claim 1, wherein the lock housing has a rotationally movable driver disk which is connected rotationally to the lock cylinder.

7. A lock in accordance with claim 1, wherein a holding force exerted by the holding element on the bolt head held in the receiving region is greater than the weight of the bolt.

8. A lock in accordance with claim 1, wherein the holding element has at least one latch element at which the bolt head can be latched.

9. A lock in accordance with claim 1, wherein an inner periphery of the holding edge corresponds to a maximum outer diameter of the bolt head within a plane which extends perpendicularly to a direction of the insertion of the bolt head into the receiving region.

10. A lock in accordance with claim 1, wherein the latch has a U-shaped locking section for gripping around multiple sides of the bolt on the bolt neck and/or at least one guide surface for stabilizing the axial locking or unlocking movement.

* * * * *